US010079791B2

(12) United States Patent
Achilles et al.

(10) Patent No.: US 10,079,791 B2
(45) Date of Patent: Sep. 18, 2018

(54) SYSTEMS AND METHODS FOR DOMAIN- AND AUTO-REGISTRATION

(71) Applicant: Xpedite Systems, LLC, Atlanta, GA (US)

(72) Inventors: Kathleen Achilles, Forked River, NJ (US); Amitava Dutta, Plainsboro, NJ (US)

(73) Assignee: Xpedite Systems, LLC, Atlanta, GA (US)

( * ) Notice: Subject to any disclaimer, the term of this patent is extended or adjusted under 35 U.S.C. 154(b) by 139 days.

(21) Appl. No.: 14/643,543

(22) Filed: Mar. 10, 2015

(65) Prior Publication Data

US 2015/0264049 A1   Sep. 17, 2015

Related U.S. Application Data

(60) Provisional application No. 61/953,321, filed on Mar. 14, 2014.

(51) Int. Cl.
| H04L 29/06 | (2006.01) |
| H04L 12/58 | (2006.01) |
| H04L 29/08 | (2006.01) |

(52) U.S. Cl.
CPC ............ *H04L 51/28* (2013.01); *H04L 67/306* (2013.01)

(58) Field of Classification Search
CPC .............................. H04L 51/28; H04L 67/306
USPC ................... 713/176, 170; 726/5, 7, 13, 22
See application file for complete search history.

(56) References Cited

U.S. PATENT DOCUMENTS

| 5,487,100 | A * | 1/1996 | Kane ...................... H04L 51/38 340/7.23 |
| 6,643,685 | B1 * | 11/2003 | Millard ............. H04L 29/12009 709/206 |
| 6,690,773 | B1 * | 2/2004 | Law ........................ G06Q 10/08 379/201.02 |
| 7,010,572 | B1 * | 3/2006 | Benjamin ............ G06Q 10/107 709/203 |
| 7,236,769 | B2 * | 6/2007 | Irlam ................... G06Q 10/107 370/352 |
| 7,272,853 | B2 * | 9/2007 | Goodman ............ G06Q 10/107 726/13 |
| 7,356,564 | B2 * | 4/2008 | Hartselle ............. G06Q 10/107 370/466 |
| 7,376,629 | B1 * | 5/2008 | McIsaac .............. G06Q 20/027 705/50 |
| 7,437,558 | B2 * | 10/2008 | Fenton ................... H04L 51/12 380/30 |
| 7,580,980 | B2 * | 8/2009 | Kawashima ......... G06Q 10/107 709/206 |

(Continued)

OTHER PUBLICATIONS

S. Kitterman, Sender Policy Framework (SPF) for Authorizing Use of Domains in Email, Version 1, IETF, Apr. 2014.*

(Continued)

*Primary Examiner* — David García Cervetti
(74) *Attorney, Agent, or Firm* — Sprinkle IP Law Group

(57) ABSTRACT

Systems and methods are provided for processing messages for registered users within an allowed domain. The method includes performing domain-registration and auto-registration for non-registered users. The method allows users to utilize messaging services without having to individually register each and every user upfront.

20 Claims, 4 Drawing Sheets

(56) References Cited

U.S. PATENT DOCUMENTS

| | | | | |
|---|---|---|---|---|
| 7,599,993 B1* | 10/2009 | Murphy | G06Q 10/107 709/206 |
| 7,620,691 B1* | 11/2009 | Goldman | H04L 29/12594 709/204 |
| 7,627,635 B1* | 12/2009 | Logue | H04L 51/12 709/206 |
| 7,730,145 B1* | 6/2010 | Frenkel | G06Q 10/107 709/206 |
| 7,822,977 B2* | 10/2010 | Katsikas | G06Q 10/107 709/206 |
| 7,917,943 B1* | 3/2011 | Dreymann | G06Q 10/00 709/206 |
| 8,055,716 B2* | 11/2011 | Morgan | G06Q 10/107 709/200 |
| 8,082,308 B1* | 12/2011 | Filev | G06F 9/468 707/608 |
| 8,090,940 B1* | 1/2012 | Fenton | H04L 12/585 709/206 |
| 8,379,867 B2* | 2/2013 | Selgas | H04L 63/061 380/259 |
| 8,392,357 B1* | 3/2013 | Zou | H04L 63/1416 707/602 |
| 8,422,488 B2* | 4/2013 | Belinchon Vergara | H04L 29/12188 370/328 |
| 8,458,264 B1* | 6/2013 | Lee | G06Q 10/107 709/206 |
| 8,667,074 B1* | 3/2014 | Farkas | H04L 51/12 709/206 |
| 8,875,251 B2* | 10/2014 | Justice, Jr. | G06Q 10/107 709/204 |
| 8,924,484 B2* | 12/2014 | Wilson | G06Q 10/107 709/206 |
| 9,621,489 B2* | 4/2017 | Carey | H04L 51/04 |
| 2001/0054075 A1* | 12/2001 | Miyanaga | H04L 51/066 709/206 |
| 2002/0006803 A1* | 1/2002 | Mendiola | H04L 29/12009 455/466 |
| 2002/0027568 A1* | 3/2002 | Nino | H04L 67/16 715/741 |
| 2002/0059385 A1* | 5/2002 | Lin | H04L 12/585 709/206 |
| 2002/0103820 A1* | 8/2002 | Cartmell | G06F 17/273 715/260 |
| 2002/0129109 A1* | 9/2002 | Nozaki | G06Q 10/107 709/206 |
| 2002/0140987 A1* | 10/2002 | Ishikawa | H04L 51/30 358/402 |
| 2003/0050988 A1* | 3/2003 | Kucherawy | H04L 12/58 709/207 |
| 2004/0054734 A1* | 3/2004 | Gilbert | G06Q 10/107 709/206 |
| 2004/0145773 A1* | 7/2004 | Oakeson | G06F 21/56 358/1.15 |
| 2004/0181462 A1* | 9/2004 | Bauer | G06Q 30/0601 705/26.1 |
| 2004/0181571 A1* | 9/2004 | Atkinson | G06Q 10/107 709/200 |
| 2004/0181581 A1* | 9/2004 | Kosco | G06Q 10/107 709/206 |
| 2004/0199595 A1* | 10/2004 | Banister | G06Q 10/107 709/207 |
| 2004/0258044 A1* | 12/2004 | Girouard | H04L 51/12 370/352 |
| 2005/0015449 A1* | 1/2005 | Klos | H04L 29/06 709/206 |
| 2005/0039019 A1* | 2/2005 | Delany | H04L 12/58 713/176 |
| 2005/0081044 A1* | 4/2005 | Giles | H04L 63/08 713/182 |
| 2005/0091318 A1* | 4/2005 | Keohane | G06Q 10/107 709/206 |
| 2005/0114453 A1* | 5/2005 | Hardt | H04L 51/12 709/206 |
| 2005/0125667 A1* | 6/2005 | Sullivan | H04L 12/585 713/170 |
| 2005/0144279 A1* | 6/2005 | Wexelblat | G06Q 30/06 709/225 |
| 2005/0188045 A1* | 8/2005 | Katsikas | G06Q 10/107 709/206 |
| 2005/0198176 A1* | 9/2005 | Landesmann | G06Q 10/107 709/206 |
| 2005/0198299 A1* | 9/2005 | Beck | G06Q 10/107 709/226 |
| 2005/0234921 A1* | 10/2005 | King | G06F 17/3089 |
| 2005/0278533 A1* | 12/2005 | Mayer | H04L 63/126 713/170 |
| 2006/0004896 A1* | 1/2006 | Nelson | G06Q 10/107 |
| 2006/0026438 A1* | 2/2006 | Stern | H04L 51/12 713/184 |
| 2006/0031319 A1* | 2/2006 | Nelson | G06Q 10/107 709/206 |
| 2006/0031333 A1* | 2/2006 | O'Neill | G06Q 10/107 709/206 |
| 2006/0112433 A1* | 5/2006 | McIsaac | H04L 51/12 726/26 |
| 2006/0143271 A1* | 6/2006 | Murphy | G06Q 10/107 709/206 |
| 2006/0156017 A1* | 7/2006 | McIsaac | H04L 51/12 713/182 |
| 2006/0168057 A1* | 7/2006 | Warren | H04L 12/585 709/206 |
| 2006/0174009 A1* | 8/2006 | Martiquet | H04W 76/022 709/227 |
| 2006/0212561 A1* | 9/2006 | Feng | H04L 63/0227 709/223 |
| 2007/0011245 A1* | 1/2007 | Kawashima | H04L 51/28 709/206 |
| 2007/0143407 A1* | 6/2007 | Avritch | G06Q 10/107 709/206 |
| 2007/0180039 A1* | 8/2007 | Sutidze | G06Q 10/00 709/206 |
| 2007/0208868 A1* | 9/2007 | Kidd | G06Q 30/02 709/229 |
| 2007/0244974 A1* | 10/2007 | Chasin | G06Q 10/107 709/206 |
| 2008/0034211 A1* | 2/2008 | Shull | H04L 29/12066 713/175 |
| 2008/0052364 A1* | 2/2008 | Zhou | G06Q 10/107 709/206 |
| 2008/0082409 A1* | 4/2008 | Huynh | G06Q 10/107 705/14.69 |
| 2008/0104181 A1* | 5/2008 | Golan | G06Q 10/107 709/206 |
| 2008/0177843 A1* | 7/2008 | Gillum | G06Q 10/107 709/206 |
| 2008/0189770 A1* | 8/2008 | Sachtjen | H04L 12/585 726/4 |
| 2008/0201433 A1* | 8/2008 | McDonald | H04L 51/14 709/206 |
| 2008/0270544 A1* | 10/2008 | Howe | G06Q 10/107 709/206 |
| 2008/0282344 A1* | 11/2008 | Shuster | H04L 12/585 726/21 |
| 2009/0080650 A1* | 3/2009 | Selgas | H04L 63/061 380/44 |
| 2009/0093249 A1* | 4/2009 | Zhu | H04W 8/06 455/433 |
| 2009/0198997 A1* | 8/2009 | Yeap | H04L 63/0823 713/155 |
| 2009/0210708 A1* | 8/2009 | Chou | H04L 9/321 713/170 |
| 2009/0216842 A1* | 8/2009 | Risher | G06Q 10/107 709/206 |
| 2009/0259725 A1* | 10/2009 | Rabinovich | G06Q 10/107 709/206 |
| 2009/0282108 A1* | 11/2009 | Sachtjen | G06Q 10/107 709/206 |

(56) References Cited

U.S. PATENT DOCUMENTS

| | | | |
|---|---|---|---|
| 2009/0307320 A1* | 12/2009 | Golan | G06Q 10/107 709/206 |
| 2010/0005146 A1* | 1/2010 | Drako | G06Q 10/00 709/206 |
| 2010/0005191 A1* | 1/2010 | Drako | G06F 15/16 709/238 |
| 2010/0011420 A1* | 1/2010 | Drako | G06Q 10/107 726/5 |
| 2010/0121928 A1* | 5/2010 | Leonard | H04L 63/1433 709/206 |
| 2010/0198928 A1* | 8/2010 | Almeida | G06Q 10/107 709/206 |
| 2010/0228973 A1* | 9/2010 | Dancer | H04L 12/58 713/168 |
| 2010/0246444 A1* | 9/2010 | Witzel | H04W 8/06 370/255 |
| 2010/0281146 A1* | 11/2010 | Lee | H04L 29/12066 709/221 |
| 2010/0287246 A1* | 11/2010 | Klos | H04L 29/06 709/206 |
| 2011/0258272 A1* | 10/2011 | Drako | G06Q 10/107 709/206 |
| 2011/0289168 A1* | 11/2011 | Allam | H04L 12/587 709/206 |
| 2012/0216040 A1* | 8/2012 | Tanamy | H04L 63/0442 713/170 |
| 2012/0226606 A1* | 9/2012 | Brown | G06F 21/33 705/40 |
| 2012/0304261 A1* | 11/2012 | Justice | G06Q 10/107 726/5 |
| 2012/0317222 A1* | 12/2012 | Almeida | G06Q 10/107 709/206 |
| 2013/0024513 A1* | 1/2013 | Sacks | G06Q 10/10 709/204 |
| 2013/0024526 A1* | 1/2013 | Sacks | G06Q 10/10 709/206 |
| 2013/0086181 A1* | 4/2013 | Vitaldevara | H04L 51/12 709/206 |
| 2013/0259028 A1* | 10/2013 | Skala | G06Q 10/107 370/352 |
| 2013/0268839 A1* | 10/2013 | Lefebvre | G06F 17/21 715/234 |
| 2013/0308165 A1* | 11/2013 | Venkatesh | G06F 3/1205 358/1.15 |
| 2013/0346331 A1* | 12/2013 | Giovannetti | G06F 17/30283 705/320 |
| 2014/0040402 A1* | 2/2014 | Johnson | G06Q 10/107 709/206 |
| 2014/0215571 A1* | 7/2014 | Shuster | H04L 63/1483 726/4 |
| 2014/0373106 A1* | 12/2014 | Morgenroth | G06Q 10/107 726/4 |
| 2015/0288639 A1* | 10/2015 | Xuan | H04L 51/22 709/206 |

OTHER PUBLICATIONS

Wong et al., Sender Policy Framework (SPF) for Authorizing Use of Domains in E-Mail, Version 1, IETF, Apr. 2006.*

S. Kitterman, Sender Policy Framework (SPF) Authentication Failure Reporting Using the Abuse Reporting Format, IETF, Jun. 2012.*

* cited by examiner

SYSTEMS AND METHODS FOR DOMAIN- AND AUTO-REGISTRATION

CROSS-REFERENCE TO RELATED APPLICATION(S)

This application is a conversion of, and claims a benefit of priority under 35 U.S.C. § 119 from U.S. Provisional Application No. 61/953,321, filed Mar. 14, 2014, entitled "SYSTEMS AND METHODS FOR DOMAIN- AND AUTO-REGISTRATION," which is hereby fully incorporated by reference herein.

TECHNICAL FIELD

This disclosure relates generally to systems and methods for processing messages. More particularly, this disclosure relates to systems and methods for processing messages for registered users within an allowed domain, and further for performing domain- and auto-registration for non-registered users.

BACKGROUND OF THE RELATED ART

Business messaging systems (BMSs) (e.g., email systems, fax systems, etc.) are common and readily available for routing and processing messages such as email messages, faxes, and so on. Many businesses employ both. BMSs can be important tools for businesses so its employees can efficiently communicate electronically via messages such as email messages, faxes and texts etc. BMSs can also be important for businesses to compete in today's electronic communications based business transactions.

BMSs generally register each individual user for smaller companies. Registering each user is difficult and cumbersome for larger companies. Thus, increasingly, large companies desire to process messages based on their domain, rather than having to register each individual user. However, this desire has never been supported by BMSs for security reasons. For example, a BMS processing email messages from an unregistered user may not correctly identify a message in which the sending address has been spoofed. This vulnerability can be exploited by hackers and spammers alike who would try to gain access to messaging services and misuse those services. Accordingly, fraud is a major concern in today's BMSs.

For small sized companies, individually entering each authorized user may be sufficient to prevent fraudulent (or even accidental) access to messaging services. However, for companies with a large number of users, individually entering each user can be very expensive and time consuming. In addition, a user may have multiple accounts, for instance, one may be associated with a home address and another a company address. If the user sends a fax from the account associated with the company, the user may be recognized as an authorized user. However, the same user trying to send a fax from their personal account may not be recognized. Thus, companies desire ways to prevent fraud and unauthorized spoofing or spamming, while still allowing users to utilize messaging services, and without having to individually register each and every user upfront.

SUMMARY OF THE DISCLOSURE

Embodiments disclosed herein provide systems and methods for processing messages including auto-registration of users and allowing users to send messages based on their domain. In some embodiments, when a message is sent via a fax service or an email service, the message is checked to prevent fraudulent messages from passing through. In some embodiments, an auto-registration process allows unregistered users of certain domains to become registered, allowing even such unregistered users to send and/or receive messages.

In some embodiments, a processing module embodied on non-transitory computer memory of a messaging system operating on one or more server machines may receive an envelope of a message during handshaking with an email client running on a device. The processing module may use information contained in the envelope to determine whether the sender is a registered user. Embodiments disclosed herein do not rely on the header of a message (which can be spoofed), but obtain information from the envelope. Envelopes are generally non-editable or alterable by end users and are very difficult to spoof. In some embodiments, checking an envelope to ensure that a message is not a spoof may be performed as a separate process, or may be performed in conjunction with another process or as part of another step in a messaging process.

The sender's address obtained from the envelope may be checked (by the processing module, for instance) to determine whether the sender's address is associated with a registered domain. If not, the message may be discarded. If the sender address is from a registered domain, other checks may be performed. For example, a check may be performed to determine whether the sender address is in a database of sender addresses authorized to use a particular fax or email service. If not, a check may be performed to determine whether the domain associated with the sender is an allowed domain. If the domain is allowed, a messaging identifier may be substituted in the message to allow the user to use the fax, email or other messaging service. If an auto-registration process is requested for the sender address, the sender address may be automatically registered and added to the database of sender addresses.

Accordingly, in some embodiments, a method for processing messages may include receiving an envelope of a message from a device communicatively connected to the messaging system and determining a sender address from the envelope of the message. The method may further include determining whether the sender address is associated with a registered user and, if so, processing the message for delivery. If the sender address is associated with a sender who has not registered with the messaging system, the method may include asynchronously and automatically initiating an auto-registration process.

One embodiment comprises a system having a processor and non-transitory computer memory including instructions translatable by the processor to perform a method substantially as described herein. Another embodiment comprises a computer program product having at least one non-transitory computer-readable storage medium storing instructions translatable by at least one processor to perform a method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
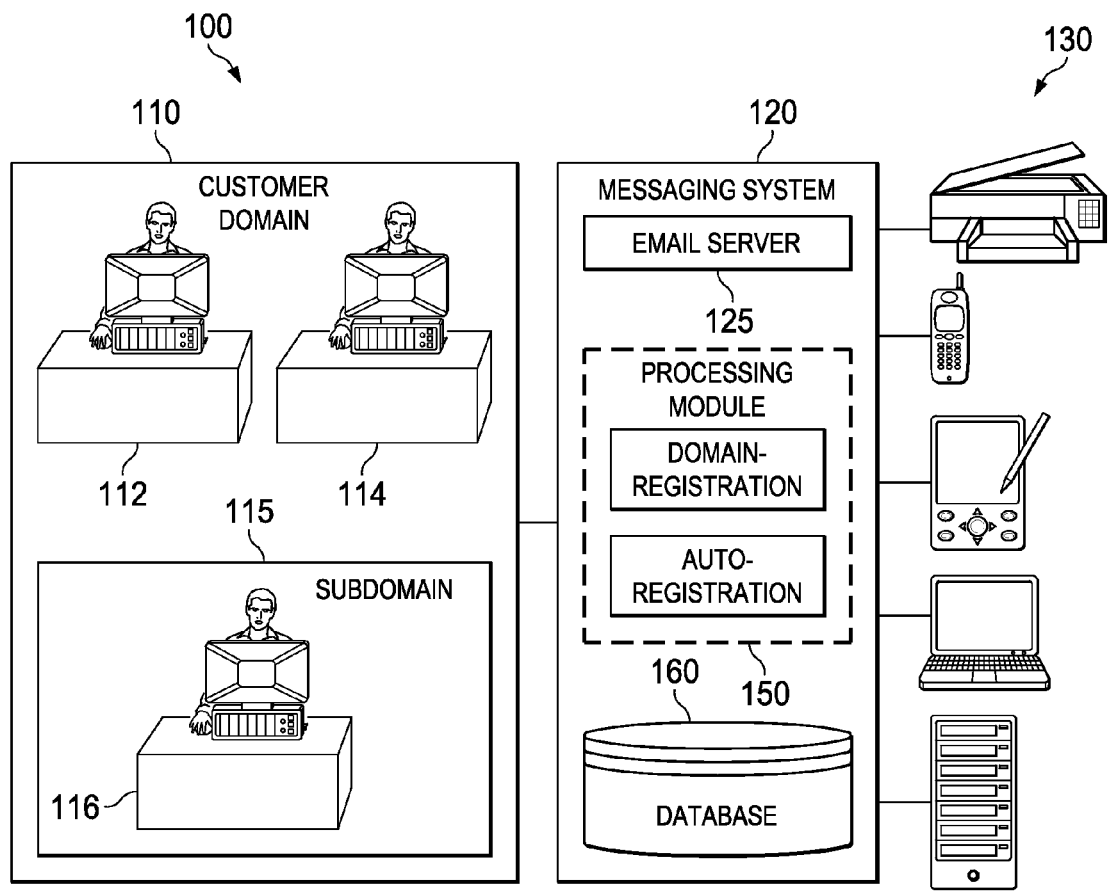
FIG. 1 depicts an example of network architecture for implementing one example embodiment of a system for processing messages.

FIG. 1 depicts an example of network architecture for implementing one embodiment of a system for processing messages. As shown in FIG. 1, customer domain 110 may include users 112 and 114, and may further include one or more subdomains 115 with user 116 associated with subdomain 115. Customer domain 110 may include validation hardware supporting a corresponding message processing system. Email messages received from users 112, 114, or 116 may be received by messaging system 120. Messaging system 120 may include email server 125, processing module 150 configured for domain-registration and auto-registration, and database 160 storing registered email addresses. Although one processing module 150 is shown in FIG. 1, there can be a plurality of processing modules. Thus, processing module 150 is meant to be illustrative and non-limiting. Furthermore, database 160 may be implemented in various ways. For example, database 160 may serve as a local database storing a subset of registered email addresses, while a central customer database (e.g., database 485 shown in FIG. 4) may store all registered email addresses for customer domain 110. In addition to email server 125, messaging system 120 may include a fax server configured for processing faxes. Messaging system 120 may be further configured for communicating with various types of client devices 130, such as mobile devices, tablets, servers, client computers, fax machines, and the like, to allow users 112, 114 and 116 to communicate with customers, clients, vendors or the like of customer domain 110.

Messaging system 120 may be configured for processing messages. In some embodiments, messaging system 120 may process messages according to domain-registration and/or auto-registration when necessary. In this disclosure, domain-registration refers to a specific message processing method in which all messages sent from a particular domain can be authorized to use a messaging system outbound service. All traffic may be billed to a single registered address (e.g., a reference address for a company owning the particular domain); while the actual sender email address may be available on reports and/or billing invoices. In some embodiments, domain-registration allows a company to register only their domain and authorize all users of their domain to send messages through messaging system 120. As explained below, domain-registration (e.g., embodied on processing module 150) utilizes a reference address, stores the original sender identification (ID) for reporting/billing purposes, and sends a notification back to the original sending email address. The original sending address may optionally be included on reports and bills.

In some embodiments, domain-registration can include auto-registration in which the actual email address of the sender is provisioned as an individual user for future messaging. Auto-registration allows a company to register their domain such that all users of that domain are authorized to send messages and, if the user is not already registered with messaging system 120, automatically register the user's email address for future messaging. Like domain-registration, auto-registration utilizes a reference address; initially, all messages for unregistered users can be sent using this address. As explained further below, auto-registration (e.g., embodied on processing module 150) stores the original sender ID for reporting/billing purposes, sends a notification back to the original sending email address, and submits a request to have the actual email address of the sender provisioned as an individual user so the sender is automatically registered for future messaging. Again, the original sending address may optionally be included on reports and bills. Note that for a period of time, messages from the user may be sent using the reference address. This may happen until the request to register the user is processed and loaded to the system (e.g., using the standard loader technology).

In some embodiments, processing module 150 may utilize a single reference address for domain-registration and/or auto-registration. In this disclosure, a reference address refers to a specific address that is recognized by processing module 150 for the purposes of these two features. A reference address is registered under a customer (e.g., a business entity, a company, etc.) account as an outbound only account that has customization such as schedule numbers, cover page options, notification options, etc.

According to some embodiments, a customer of messaging system 120 registers their domain with messaging system 120 for processing messages from the domain. Once a domain is registered, any user from that domain would be able to send messages. However, instead of indiscriminately accepting any message from this domain, messaging system 120 may perform a provisioning process of creating a special account for an unregistered user.

Specifically, if a customer account (e.g., for a particular company) of messaging system 120 is configured for auto-registration and their domain is registered via domain-registration, a message (e.g., a fax) from a user's email address in the domain will be allowed to proceed and be processed the first time using the company's special reference address, but messaging system 120 will automatically send the user's email address to be registered under the company's customer ID. In this way, the next time the user sends a message, it will be sent using the user's email address as opposed to using the default domain-registration or the associated reference address. This solution advantageously allows large companies to use the messaging services provided by messaging system 120 without having to manage a large number of their users.

In some embodiments, messaging system 120 may be configured to provide customization. For example, a message from an employee of a company may have optionally the company's logo, banner, header, and/or footer on a cover page. If a particular user requires different settings, they can be individually registered and the customizations applied. A company's reference email address may also be used for providing customization. For example, if messages from a company are subject to an auto-registration process, messaging system 120 may duplicate custom features of the company's reference email account in creating/provisioning a user account for an unregistered sender.

In some embodiments, a company may be billed based on its employee use of a messaging service. That is, messaging system 120 can optionally track and determine who sent how many messages to where. In this way, although messages are billed to a central account address for the company, the company has the option of knowing by a separate report that a specific user or users sent 20 messages or 50 messages in a certain time period, etc. That is, messaging system 120 may maintain information regarding the original sender of a message (e.g., a fax or an email). Messaging system 120 (via processing module 150) may track senders of the faxes and emails and include such tracking information in a report to the company. For example, for a company whose domain is registered, a report may indicate that the company has sent 500 emails during a particular time period and may include the original senders' IDs associated with those emails.

Figure 2:
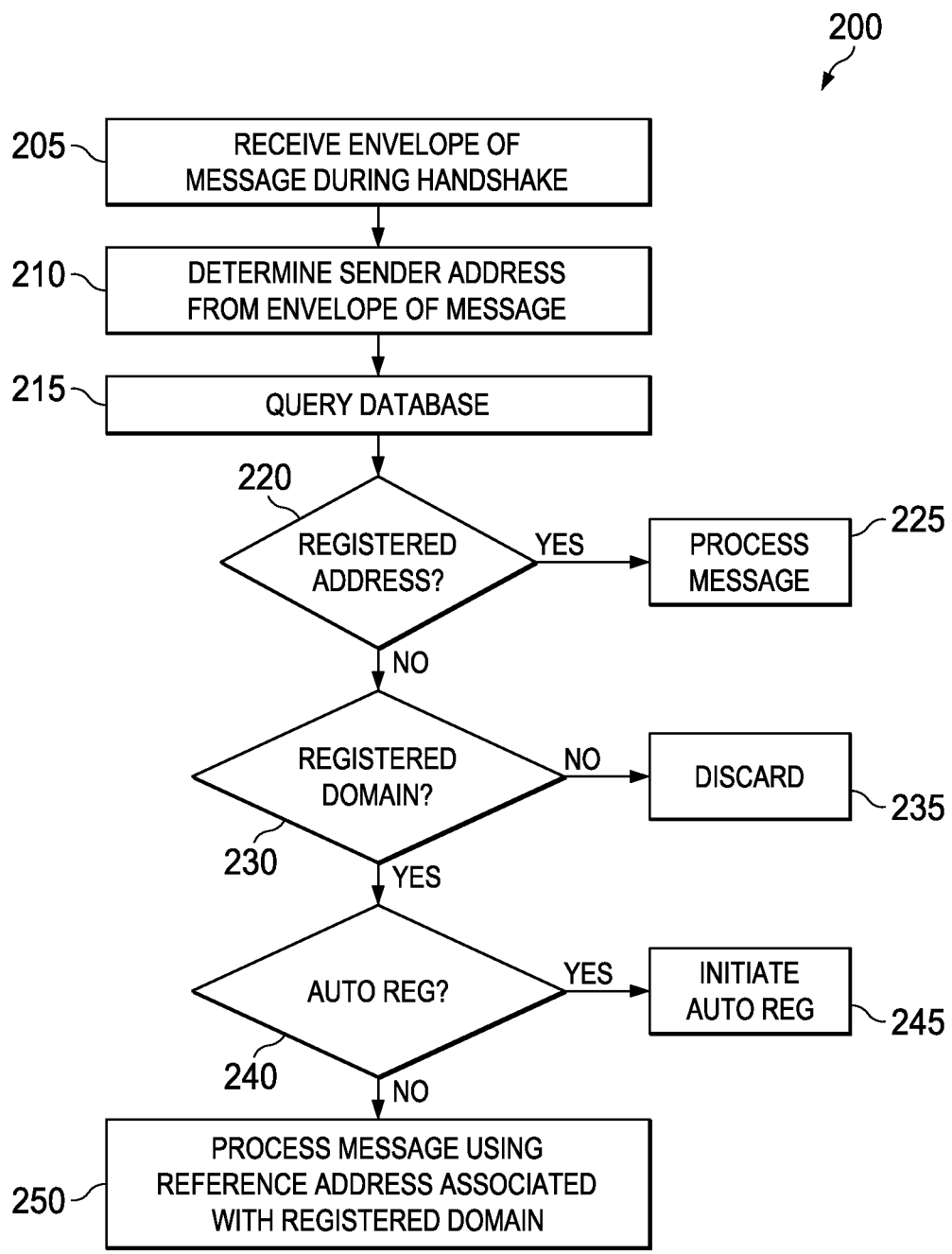
FIG. 2 is a flow diagram illustrating one example embodiment of a method for processing messages in accordance with domain-registration.

FIG. 2 depicts a flow diagram illustrating one example process 200 for processing messages according to domain-registration. In step 205, an envelope of a message may be received by a processing module during a Simple Mail Transfer Protocol (SMTP) handshake. In some embodiments, processing module 150 of messaging system 120 shown in FIG. 1 may be particularly configured to perform process 200. An envelope refers to a small data file that travels with (usually ahead of) the item being delivered. SMTP defines message transport, not the message content. Thus, it defines the mail envelope and its parameters, such as the envelope sender, but not the header (other than trace information) nor the body of the message itself. SMTP is known to those skilled in the art and thus is not further described herein.

Using information in the envelope, process 200 may determine a sender address for the message (step 210). In step 215, process 200 may query a database (e.g., a local database such as database 160 shown in FIG. 1 or a customer provisioning database such as central customer database 485 shown in FIG. 4) about the sender address and determine whether the sender address is a registered address (step 220). If so, the message is proceed normally (step 225). If the sender address is not found in the database, process 200 may determine whether the sender address is associated with a registered domain (step 230).

In some embodiments, determining whether the sender address is associated with a registered domain may comprise extracting domain information from the sender address and comparing the extracted domain information with domain-registration information maintained at messaging system 120. In some embodiments, if the domain is not a registered domain, the message may be discarded (step 235). In some embodiments, determining whether the sender address is associated with a registered domain may further comprise determining whether a domain or subdomain of the sender address is allowed. In some embodiments, each domain and each subdomain within a domain is separately registered. This is further explained below. If the domain is registered, process 200 may determine whether to initiate an auto-registration of the user (step 240). This determination may depend on, for instance, a predetermined setting at messaging system 120 indicating that an unregistered sender associated with a particular registered domain is to be auto-registered.

If the unregistered sender is to be auto-registered, process 200 may initiate an auto-registration process (step 245). In some embodiments, this step may occur asynchronously and be initiated automatically while the message is being processed. If the unregistered sender is not to be auto-registered, process 200 may proceed to process the message using a reference address associated with the registered domain (step 250). This is further explained below.

Figure 3:
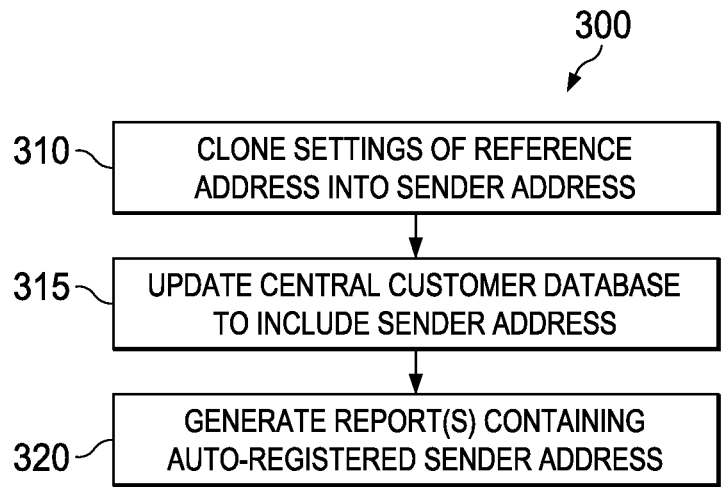
FIG. 3 is a flow diagram illustrating one example embodiment of a method for auto-registration.

FIG. 3 depicts a flow diagram illustrating one example process 300 for auto-registration. In some embodiments, processing module 150 of messaging system 120 may be particularly configured to perform process 300. As described above, process 300 may be initiated when an unregistered sender attempts to send a message from a registered or allowed domain. Initially, a message may be marked (e.g., by processing module 150) to be sent on behalf of a reference address associated with the registered domain. As explained above, such a reference address may be particularly created for a registered domain (e.g., a reference address for the domain "company.com" may be refaddress@company.com), and messages from users within the registered domain may be sent using the reference address, even if a user was not previously registered.

The use of a reference address has advantages. As an example, a company might not want each person to be registered, cannot allocate sufficient resources to register each user, or does not need each user to be registered. In such cases, a reference address may be created so that users can still send messages (e.g., emails, faxes, etc.) from an allowed domain or subdomain using the reference address, even if they have not been individually registered.

To auto-register the unregistered sender, in step 310, settings of a reference address may be cloned or otherwise duplicated for the sender address. In some embodiments, the presence of the reference address may indicate to messaging system 120 that the sender is allowed to send messages. For example, in a billing system, a (fictitious) messaging ID may be set up such that subsequent messages sent by the messaging system when sending messages from a sender may still be associated with the messaging ID. Advantageously, this allows a company to determine whether a user is to be registered or whether subsequent messages are to be sent using the messaging ID.

In step 315, process 300 may update a customer provisioning database (e.g., central customer database 485 shown in FIG. 4) to include the sender address. At this point, the sender address (and hence the previously unregistered user associated therewith) may be considered to be auto-registered. Subsequently, after the user has been auto-registered and the customer provisioning database has been updated to include the now auto-registered user address, one or more reports containing the auto-registered sender address may optionally be generated (step 320).

In some cases, registered domains with the auto-registration feature may be configured with one or more of the following customizations per domain:

All notifications are sent to the original sender ID until the registration process is completed.

After registration, if the reference address includes alternate delivery settings, those settings will apply.

A single banner, header, and footer (cover page) is used for all users.

All users are provisioned on the same schedule.

If a particular user requires different settings, they can be individually registered and the customizations applied.

For domain-registration, notifications may always be sent to the original sender.

Alternate email addressing may be ignored. For auto-registration, alternate email addressing may be ignored until a corresponding user account is registered. If the reference address includes alternate delivery addressing, it can be set on the registered email address. The reference address's settings may be copied, cloned, or duplicated into the newly registered email address, thereby producing a newly registered email address with the same attributes of the reference address.

In some embodiments, the reference address can be fixed. For example, "ref.address" may be used such that "ref.address@companyname.com" may always be used as the reference address for "companyname.com" where "companyname.com" is the fully qualified domain name of a particular customer. Note that the messaging system does not perform pattern matching comparing individual addresses. Rather, only domains that are registered are matched by the messaging system.

The messaging system allows for some flexibility for the auto-registration feature where different schedules and cover pages can be associated with a particular company's domains. For example, suppose a company's domain name is "globalcompanyname.com" and has an email address registered under a customer account of the messaging system as: "reference_address@ globalcompanyname.com." If there are several domains or $3^{rd}$, $4^{th}$ etc. domain levels, each domain would need to be registered and have a unique reference address. As a specific example, if globalcompanyname.com has a third level domain for their international office, namely, "international.globalcompanyname.com" and they would like that domain to be authorized, a second reference address must be registered under their account as: "reference_address@international.globalcompanyname.com." Otherwise, messages from international.globalcompanyname.com will not be authorized.

Figure 4:
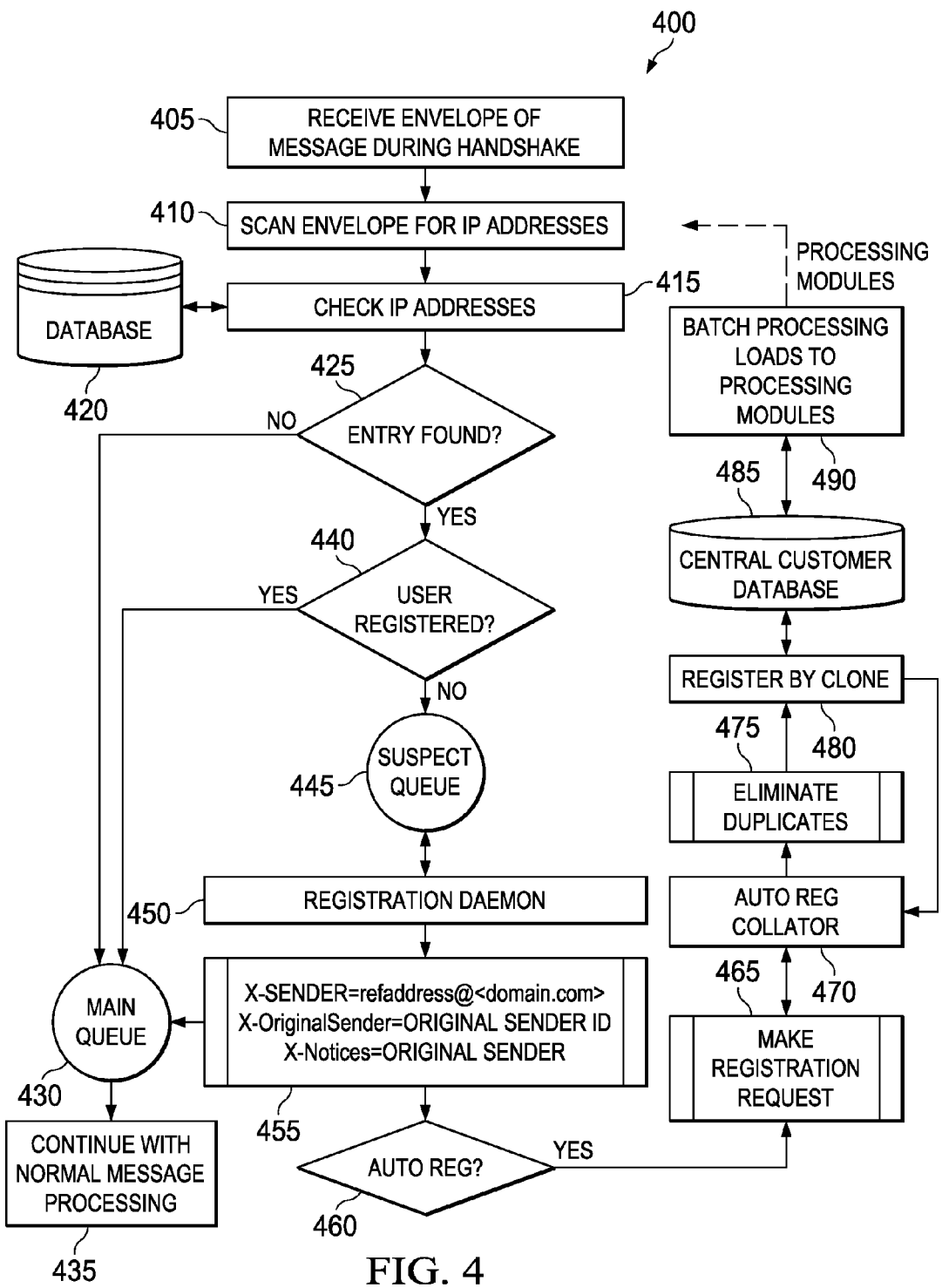
FIG. 4 is a flow diagram illustrating one example embodiment of a method for processing messages.

FIG. 4 depicts a flow diagram illustrating one embodiment of method 400 for processing messages. Embodiments may begin when an envelope of an incoming email message is received (step 405), for instance, by a special computer program that runs as a background process (also referred to as a daemon). In some embodiments, this special computer program may implement a "send mail" feature of the Sender Policy Framework (SPF). Those skilled in the art will appreciate that SPF refers to an email validation system that provides a mechanism to allow receiving mail exchange servers to check whether incoming mail from a domain is being sent from an authorized host. Those skilled in the art will also appreciate that the "send mail" feature refers to an internetwork email routing facility that supports many types of mail transfer and delivery methods, including SMTP used for email transport over the Internet. Accordingly, in some embodiments, this special computer program can scan an envelope of a message for IP addresses that are registered with a messaging system (e.g., messaging system 120 shown in FIG. 1). If the IP address is not found, the message is rejected. In some embodiments, a list of all mail server IP addresses of a customer is provided to the messaging system by the customer so that they can be configured into the messaging system (e.g., via configuration files).

An email is a plain text file having a header and a message body. The header may refer to top few lines in the text file. For example, the header may include the text "from" and an email address, etc. The header is followed by the message body. The header and the message body together form the email content. An envelope exists outside of the header and is used to route email between the email gateway servers. An envelope in a network environment may differ from its counterparts in the physical world in various ways. For example, an email server may read the delivery information contained in an envelope (e.g., a sender address) during handshaking (in a sender-receiver transaction, the envelope is sent over first), discard the envelope afterwards, and deliver the header and the body of the email. An envelope can be created by a user's email software, for instance, when the user composes an email and clicks the send button. The email software may configure the envelope depending on a user's account, for instance, how the user's account was set up by a system administrator.

An example of an email envelope interchange is provided below:

220 mail.recipientcompany.com Microsoft ESMTP MAIL Service ready at Thu, 30 Oct. 2014 13:47:11-0500
helo ppef10
250 mail.recipientcompany.com Hello [168.251.9.1]
mail from: abcdef@sendercompany.com
250 2.1.0 Sender OK
rcpt to: zxcvbnm@recipientcompany.com
250 2.1.5 Recipient OK
data
354 Start mail input; end with <CRLF>.<CRLF>
From: Some User
To: Jane
Subject: Example email
.
This is an example.
250      2.6.0<7096118d-69b1-4758-b2dd-774bedd5f9d2@SERVER2.   recipientcompany.local> Queued mail for delivery
quit
221 2.0.0 Service closing transmission channel
Connection to 148.235.219.121 closed by foreign host.

According to some mail transport protocols (e.g., SMTP), an envelope may be discarded before the message is handed to the user, so users typically do not see and are not aware of the envelope. Moreover, end users generally have no control over the envelope and would not be able to modify an envelope. Even if on the top of the email someone writes any other address and at the bottom signs it as someone else in the text of the email, when the email goes out from a computer software system, the pre-configured email address in the enveloped is used by email servers. Email servers do not use the header or the email content to determine who the sender is. When an email program such as Outlook receives an email message, it may store information from an envelope of the message in an exchange log. However, that information is not accessible to an end user as the email program would remove the envelope before adding the email message to an inbox of the user.

Advantageously, using information obtained from an envelope of a message can prevent fraud because the envelope is automatically generated by the email software and cannot be modified by users. This ensures the secure encapsulation of information contained in an envelope. As illustrated in the example, above, an envelope contains important information for routing an email message. For example, an email server may use an address on a command line in an envelope to send a fax.

Because the envelope is not easy to spoof and/or alter, using the envelope to verify a sender's information can ensure that the information contained in the envelope is the true, authentic sender's information. Thus, in the example above, the sender's address "abcdef@sendercompany.com" in the header of the envelope is considered the true, unaltered sender's address. In this way, a sender's address in an envelope may be trusted by the messaging system and used to determine whether or not that address has been registered before.

Referring to FIG. 4, the received envelope may be scanned for IP addresses (step 410), for instance, by a daemon implementing the "send mail" feature described above. After getting the information from the envelope, the message format may be checked (e.g., by a custom email server) to ensure that the message can be processed further. In some embodiments, process 400 may use the information from the envelope and refer to a switcher table for routing particular email addresses, domains, phone numbers, etc., to particular parsers for further processing. For example, a company may utilize old formats in messaging. Embodiments may utilize the switcher table to check an address, determine that the address utilizes an older format, and send the message to a parser configured for modifying the address into a supported format such that the message is not discarded.

In some embodiments, IP addresses obtained from an envelope may be compared with entries stored in database 420 (step 415). Depending upon implementation, database 420 may contain auto-registration (AutoReg) entries or domain-registration (DomainReg) entries. In some embodiments, once a reference address is provisioned for a customer, the appropriate entry is made into database 420. In some embodiments, database 420 may be local to the messaging system, similar to database 160 of messaging system 120 shown in FIG. 1.

For auto-registration, the source is set to the fully qualified domain name and the database address is set to AutoReg. For domain-registration, the source is set to the fully qualified domain name and the database address is set to Domain Reg. A domain can be set to either AutoReg or DomainReg. If no AutoReg or DomainReg entry is found (step 425), process 400 forwards the message to main queue 430 and no domain-registration or auto-registration is performed for the received message. At step 435, normal message processing is continued.

If an entry is found in database 420 (either corresponding to a full sender address or some other recognized address associated with a registered domain), process 400 may operate to determine whether a user associated with the sender address is a registered user (step 440), for instance, by checking and determining whether a full sender address is stored in a database of registered users. If a full sender address can be found in the database of registered users, process 400 may forward the message to main queue 430 and the message is processed normally (step 435).

If a full sender address cannot be found in the database of registered users, the message may be placed in second queue 445 (may also be referred to as a "suspect" queue) for further processing. A suspect queue may contain any message from any user that is not specifically registered with the system. Users with domain- or auto-registration may be moved through the system for further processing, while other messages may be discarded as spam. In some embodiments, registration daemon 450 may be configured for monitoring suspect queue 445. Specifically, daemon 450 may check (periodically or continuously) each message in queue 445 to determine whether domain- or auto-registration may be associated with a particular message in queue 445.

Further processing may include checking a domain or a subdomain of the sender address to determine whether the domain or subdomain is or has been allowed. In some embodiments, if a message is associated with a domain that is allowed, the message may be augmented and placed back in main queue 430 for processing. In some embodiments, augmenting a message may include adding special X-headers. Example X-headers are shown in FIG. 4.

Further processing may also include checking the domain to determine whether auto-registration is requested (step 460). If so, a registration request is made (step 465) and the sender information is sent to an auto-registration queue managed by auto-registration collator 470. Such a registration request may be processed independently of the message processing. That is, the auto-registration process can be launched after the message is placed in main queue 430 for delivery. In this way, the auto-registration process can be asynchronous and does not have any effect on the delivery of the original message. As described above, an auto-registration process may be initiated automatically if a sender address is associated with a sender who has not registered with the messaging system, and may be initiated asynchronously.

Accordingly, the auto-registration request may be received by auto-registration collator 470. Auto-registration collator 470 may return a receipt acknowledging the receipt of the auto-registration request. In some embodiments, auto-registration collator 470 can be a central program that accepts auto-registration requests from processing modules (e.g., processing module 150 of messaging system 120 shown in FIG. 1), cleans up the requests, and interacts with register 480. In some embodiments, register 480 can be a central program that accepts registration requests from auto-registration collator 470 and communicates status. In some embodiments, duplicate requests for auto-registration may be removed or otherwise eliminated (step 475) prior to requests being sent to register 480. In some embodiments, register 480 may operate to create/provision a new user address, clone or duplicate settings of a reference address for the new user address, and store the provisioned user address in central customer database 485. In some embodiments, changes made to database 485 (e.g., newly registered user addresses) may be communicated to processing modules of the messaging system via batch processing module 490.

Figure 5:
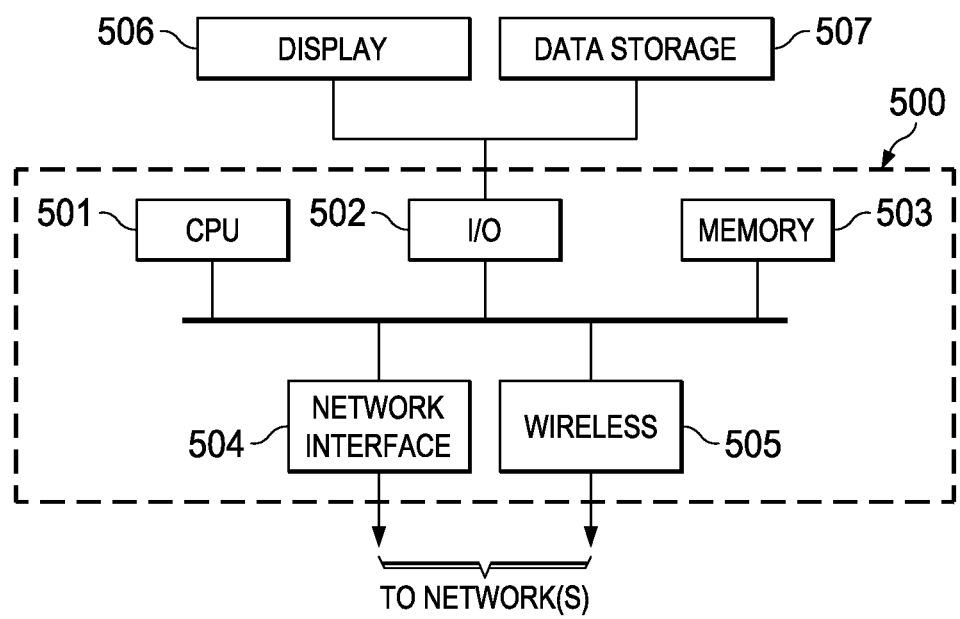
FIG. 5 depicts a diagrammatic representation of an example of a data processing system embodying a messaging system disclosed herein.

FIG. 5 depicts a diagrammatic representation of a data processing system for implementing a system for processing messages. As shown in FIG. 5, data processing system 500 may include one or more central processing units (CPU) or processors 501 coupled to one or more user input/output (I/O) devices 502 and memory devices 503. Examples of I/O devices 502 may include, but are not limited to, keyboards, displays, monitors, touch screens, printers, electronic pointing devices such as mice, trackballs, styluses, touch pads, or the like. Examples of memory devices 503 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 500 can be coupled to display 506, information device 507 and various peripheral devices (not shown), such as printers, plotters, speakers, etc. through I/O devices 502. Data processing system 500 may also be coupled to external computers or other devices through network interface 504, wireless transceiver 505, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used.

The functions of the invention can be embodied on distributed, or networked systems which may include hardware components and/or circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for processing messages, comprising:
   receiving, over a network by a processing module embodied on non-transitory computer memory of a messaging system operating on one or more server machines, an envelope of a message from a user's device communicatively connected to the messaging system via the network;
   the processing module determining a sender address from the envelope of the message;
   the processing module determining whether the sender address, thus determined by the processing module from the envelope of the message received from the device, is associated with any of a set of registered domains of the messaging system;
   the processing module discarding the message if the sender address from the envelope of the message is not associated with any of the set of registered domains;
   the processing module allowing processing of the message to proceed for delivery of the message if the sender address from the envelope of the message is associated with one of the set of registered domains; and
   the processing module determining whether the sender address from the envelope of the message is associated with any of a set of registered users of the messaging system and, if the sender address from the envelope of the message is not associated with any of the set of registered users of the messaging system, automatically initiating an auto-registration process that provisions a new email address for the user associated with the message.

2. The method according to claim 1, wherein the envelope of the message is received during handshaking with an email client running on the device.

3. The method according to claim 1, wherein the determining whether the sender address is associated with a registered user further comprises determining a domain or subdomain of the sender address.

4. The method according to claim 3, wherein the auto-registration process is not initiated if the messaging system determines that the domain or subdomain of the sender address is not avowed.

5. The method according to claim 4, wherein the auto-registration process further includes:
   generating an entry in an authorization queue, the entry including the sender address; and
   processing the entry in the authorization queue to determine whether the sender address is allowed based on the domain or the subdomain of the sender address.

6. The method according to claim 1, wherein the auto-registration process comprises:
   marking the message to be sent on behalf of a reference address;
   cloning settings of the reference address into the sender address; and
   updating a customer provisioning database to include the sender address.

7. The method according to claim 6, further comprising:
   generating one or more reports containing the sender address.

8. The method according to claim 1, wherein auto-registration process comprises:
   processing auto-registration of the sender address to remove duplicate requests for auto-registration of the sender address; and
   generating a message address based on the sender address and a reference address associated with an organization's network domain, the message address for use by the messaging system when sending messages from a sender.

9. The method according to claim 1, further comprising:
   processing the message to determine whether to initiate the auto-registration process for the sender address or a domain-registration process for the sender address.

10. The method according to claim 1, further comprising:
    if the sender address matches any of registered email addresses in a database, processing the message for delivery;
    if the sender address does not match any of the registered email addresses in the database, determining a domain or subdomain of the sender address;
    determining whether the domain or subdomain is registered with the messaging system; and
    if the domain or subdomain of the sender address is registered with the messaging system, asynchronously and automatically initiating the auto-registration process.

11. The method according to claim 10, further comprising:
    if the domain or subdomain of the sender address is not registered with the messaging system, discarding the message.

12. A messaging system for processing messages, the system comprising:
    at least one processor; and
    non-transitory computer memory including instructions translatable by the at least one processor to perform:
    receiving, over a network an envelope of a message from a users device communicatively connected to the messaging system via the network;
    determining a sender address from the envelope of the message;
    determining whether the sender address, thus determined by the processor from the envelope of the message received from the device, is associated with any of a set of registered domains of the messaging system;
    discarding the message if the sender address from the envelope of the message is not associated with any of the set of registered domains;
    allowing processing of the message to proceed for delivery of the message if the sender address from the envelope of the message is associated with one of the set of registered domains; and
    determining whether the sender address from the envelope of the message is associated with any of a set of registered users of the messaging system and, if the sender address from the envelope of the message is not associated with any of the set of registered users of the messaging system, automatically initiating an auto-registration process that provisions a new email address for the user associated with the message.

13. The system according to claim 12, wherein the envelope of the message is received during handshaking with an email client running on the device.

14. The system according to claim 12, wherein the determining whether the sender address is associated with a registered user further comprises determining a domain or subdomain of the sender address.

15. The system according to claim 12, wherein the auto-registration process is not initiated if the messaging system determines that the domain or subdomain of the sender address is not avowed.

16. The system according to claim 15, wherein the auto-registration process further includes:
   generating an entry in an authorization queue, the entry including the sender address; and
   processing the entry in the authorization queue to determine whether the sender address is allowed based on the domain or the subdomain of the sender address.

17. The system according to claim 12, wherein the auto-registration process comprises:
   marking the message to be sent on behalf of a reference address;
   cloning settings of the reference address into the sender address; and
   updating a customer provisioning database to include the sender address.

18. The system according to claim 17, wherein the instructions are further translatable by the at least one processor to perform:
   generating one or more reports containing the sender address.

19. The system according to claim 12, wherein auto-registration process comprises:
   processing auto-registration of the sender address to remove duplicate requests for auto-registration of the sender address; and
   generating a message address based on the sender address and a reference address associated with an organization's network domain, the message address for use by the messaging system when sending messages from a sender.

20. The system according to claim 12, wherein the instructions are further translatable by the at least one processor to perform:
   processing the message to determine whether to initiate the auto-registration process for the sender address or a domain-registration process for the sender address.

* * * * *